(12) United States Patent
Nishimura

(10) Patent No.: US 11,017,009 B2
(45) Date of Patent: May 25, 2021

(54) SYSTEMS AND METHODS FOR ARRANGING CONTEXTUALLY RELATED MEDIA ASSETS

(71) Applicant: Rovi Guides, Inc., San Jose, CA (US)

(72) Inventor: Akitaka Nishimura, Tokyo (JP)

(73) Assignee: ROVI GUIDES, INC., San Jose, CA (US)

( * ) Notice: Subject to any disclaimer, the term of this patent is extended or adjusted under 35 U.S.C. 154(b) by 358 days.

(21) Appl. No.: 16/216,208

(22) Filed: Dec. 11, 2018

(65) Prior Publication Data

US 2019/0121820 A1    Apr. 25, 2019

Related U.S. Application Data

(63) Continuation of application No. 14/742,371, filed on Jun. 17, 2015, now Pat. No. 10,176,178.

(51) Int. Cl.
| | |
|---|---|
| *G06F 16/00* | (2019.01) |
| *G06F 16/40* | (2019.01) |
| *H04L 29/08* | (2006.01) |
| *G06F 16/438* | (2019.01) |
| *G06F 16/435* | (2019.01) |
| *H04N 21/442* | (2011.01) |
| *H04N 21/466* | (2011.01) |
| *H04N 21/482* | (2011.01) |
| *G06F 16/43* | (2019.01) |

(52) U.S. Cl.
CPC .............. *G06F 16/40* (2019.01); *G06F 16/43* (2019.01); *G06F 16/435* (2019.01); *G06F 16/438* (2019.01); *H04L 67/306* (2013.01); *H04N 21/44222* (2013.01); *H04N 21/4668* (2013.01); *H04N 21/4826* (2013.01)

(58) Field of Classification Search
CPC ........ G06F 16/40; G06F 16/43; G06F 16/435; G06F 16/438; H04L 67/306; H04N 21/44222; H04N 21/4668
See application file for complete search history.

(56) References Cited

U.S. PATENT DOCUMENTS

| | | | |
|---|---|---|---|
| 9,094,730 B1* | 7/2015 | Kirmse ............ | H04N 21/25825 |
| 2007/0071399 A1* | 3/2007 | Ellis ................... | H04N 5/782 |
| | | | 386/293 |
| 2013/0174035 A1* | 7/2013 | Grab ................... | H04N 21/47 |
| | | | 715/716 |

(Continued)

*Primary Examiner* — Jared M Bibbee
(74) *Attorney, Agent, or Firm* — Haley Guiliano LLP

(57) ABSTRACT

Systems and methods are provided herein for automatically arranging media assets that are contextually related to a requested media asset for access prior to a start time of the requested media asset. In some embodiments, user input circuitry may receive a user request to access a media asset. Control circuitry may identify, by consulting a database, a first set of media assets that share a context with the requested media asset and were released prior to the release date of the requested media asset. Control circuitry may determine a subset of media assets of the first set of media assets by performing a comparison of each media asset of the first set of the media assets against a viewing history of the user. Control circuitry may access a user profile to determine a user constraint, and generate a recommendation for display based on a first aspect of the user constraint.

20 Claims, 5 Drawing Sheets

(56) References Cited

U.S. PATENT DOCUMENTS

| | | | |
|---|---|---|---|
| 2013/0346144 A1* | 12/2013 | Ferren | G06F 3/0383 705/7.29 |
| 2014/0006550 A1* | 1/2014 | Cain | H04N 21/42203 709/217 |
| 2014/0215506 A1* | 7/2014 | Kalmes | H04N 21/4524 725/14 |
| 2015/0128158 A1* | 5/2015 | Wheatley | H04N 21/42221 725/12 |
| 2015/0245101 A1* | 8/2015 | Stathacopoulos | H04N 21/47217 725/61 |
| 2016/0127784 A1* | 5/2016 | Roberts | H04N 21/4725 725/12 |
| 2016/0306797 A1* | 10/2016 | Taboriskiy | G06F 16/48 |
| 2017/0134814 A1* | 5/2017 | Stathacopoulos | H04N 21/8106 |

* cited by examiner

SYSTEMS AND METHODS FOR ARRANGING CONTEXTUALLY RELATED MEDIA ASSETS

CROSS-REFERENCE TO RELATED APPLICATIONS

This application is a continuation of U.S. patent application Ser. No. 14/742,371, filed Jun. 17, 2015. The entire contents of which are hereby incorporated by reference herein in its entirety.

BACKGROUND

Consumers are finding an increasing ability to access media assets through a growing number of different sources, such as by scheduling a recording of a future airing, ordering it via video-on-demand, or playing it on an online platform. A consumer who has requested to access a media asset that is contextually related to media assets with prior initial air dates (e.g., a late episode of a television series, such as episode 8) may wish to view the earlier media assets. In such a case, the user must manually search for the remaining contextually related media assets (e.g., episodes 1-7) from the different sources in order to create a desired plan to consume the remaining media assets in a timely and logical manner. Failure to do so would cause the consumer to miss an intervening media asset that may contain crucial plot points for the requested media asset.

SUMMARY

Systems and methods are provided herein for automatically arranging contextually related media assets for a user to access. In some aspects, these systems and methods comprise determining a user constraint and a subset of media assets that the user has not yet viewed so as to generate a recommendation, based on the user constraint, for the user to view the media assets in the correct contextual order.

In some embodiments, control circuitry may determine that user input circuitry has received, from the user, a request to access a media asset. For example, the user may schedule a reminder for Episode 8 of the TV series The Blacklist on user equipment using a remote control. Control circuitry may determine that the request indicates that the recording is scheduled for the airing in 5 days.

In some embodiments, control circuitry identifies a first set of media assets by consulting a database (or other storage circuitry). Control circuitry may ensure that each media asset of the first set of media assets is released prior to a release date of the requested media asset. Additionally, control circuitry may ensure that each media asset of the first set of media assets shares a context with the requested media asset—e.g., by being sequential episodes of a series, movie sequels, or other contextually related videos. For example, the control circuitry of the user equipment may consult a remote server to identify media assets that share a context with the scheduled Episode 8 of The Blacklist, such as Episode 7 available on an online video streaming service (e.g., Netflix), Episode 6 scheduled to air in 2 days, and an on-demand Episode 5 available for purchase on another online video streaming service (e.g., Amazon Instant Video).

In some embodiments, control circuitry may determine a subset of media assets of the first set of media assets, where the subset of media assets have not been viewed by the user. In some embodiments, the control circuitry may make the determination by performing a comparison of each media asset of the first set of media assets against a viewing history of the user. For example, the control circuitry may determine that the viewing history of the user indicates that Episodes 1-4 have previously been viewed by the user. The control circuitry may accordingly recommend to the user Episodes 5, 6, and 7 prior to the scheduled airing time of Episode 8.

In some embodiments, control circuitry may access a user profile to determine a user constraint. The control circuitry may determine that the user constraint indicates criteria for finding and arranging the contextually related media assets, such as video resolution, total cost of purchase (i.e., budget), timing of broadcast, duration, theme, availability, mode of delivery, speed of access, user availability, and other user preferences for the media assets. For example, control circuitry may access the user profile to determine that the user has set a constraint for a total budget of "$5.00" and resolution of "SD or above." The control circuitry may make any subsequent arrangement of episodes 6 and 7 for the user that fulfills the user constraint.

In some embodiments, control circuitry may generate a recommendation based on a first aspect of the user constraint. The control circuitry may determine that the recommendation includes a recommended manner of accessing each media asset of the subset prior to a first start time of the requested media asset. For example, the control circuitry may recommend accessing Episodes 5, 6, and 7 based on the user budget constraint of no more than $5.00, and find that an online media store (e.g., Apple iTunes Store) offers all three episodes at $4.50 for a limited time. If the episodes on the online media store can be accessed prior to the start time of the scheduled Episode 8, the control circuitry may generate a recommendation containing Episodes 5, 6, and 7 as found on the online media store, along with their associated cost and timing information.

In some embodiments, control circuitry may generate the recommendation for display. For example, the control circuitry of the user equipment may generate for display a notification box indicating that Episodes 5, 6, and 7 may be accessed from an online media store (e.g., Apple iTunes Store) prior to the scheduling broadcast time of Episode 8, for a total cost that is within the budget set by the user constraint.

In some embodiments, control circuitry may determine, based on the user constraint, that at least one media asset of the subset cannot be accessed prior to the first start time of the requested media. For example, the control circuitry may determine that Episode 6, which belongs to the subset of media assets that the user has not yet viewed, is not available from any of the different sources. As another example, the control circuitry may determine that Episode 6 is not available given the user's budget constraint of $5.00, because the only source offering Episode 6 before the broadcast time of Episode 8 charges $50.00 for an on-demand access.

In some embodiments, control circuitry may automatically generate for display a notification indicating a second start time of the requested media that is later than the first time. In some embodiments, the control circuitry may determine that the second start time is sufficient for each media asset in the subset to be completely consumed prior to the second start time. For example, the control circuitry may determine that Episode 8 of The Blacklist will be aired again (at a second starting time) in 2 weeks, after the original air time (i.e., the first starting time) that was scheduled in 5 days. The control circuitry may additionally determine that Episode 6 will be available on a television channel between the first starting time and the second starting time the Episode 8, at no cost to the user. Accordingly, the control circuitry may generate a notification indicating that Episode 8 has a second start time in two weeks, which is sufficient for Episode 6 to be completely consumed in advance of the user viewing Episode 8.

In some embodiments, control circuitry may generate the recommendation by creating possible combinations of the manners of accessing the media assets of the subset. The control circuitry may first determine a number of possible manners of accessing the media assets. For example, the control circuitry may search on the different sources of media assets to determine various manners of accessing Episodes 5, 6, and 7 as on-demand, pay-per-view, or broadcast media assets. Examples of possible manners of access include ordering Episode 5 on-demand via the television ($2.00), ordering Episode 6 as part of a limited-time offer on an online media store (e.g., Apple iTunes Store) ($1.00), scheduling Episode 7 for recording on television ($0.00, in 10 days), and ordering Episode 7 on an online video streaming service (e.g., Amazon Instant Video) ($5.00).

In some embodiments, control circuitry automatically permutes possible combinations of the manners of accessing the media assets to generate an evaluation metric, such as a timing and cost metric, for each possible combination. For example, one possible combination may be ordering Episode 5 on television for $2.00, ordering Episode 6 on an online media store (e.g., Apple iTunes Store) for $1.00 and scheduling Episode 7 for recording in 10 days for $0.00. Another possible combination may be ordering Episodes 5 and 6 like in the first possible combination, and ordering Episode 7 on an online video streaming service (e.g., Amazon Instant Video) for $5.00. The control circuitry may generate an evaluation metric for each possible combination, such that the first possible combination will be accessible in 10 days and costs $3.00, and the second possible combination will be accessible instantly and costs $8.00.

In some embodiments, control circuitry may compare the evaluation metric for each possible combination against the user constraint to determine an optimal combination. In the above example, the control circuitry may, based on the user constraint of a "$5.00" total budget, determine that only the first possible combination meets the user constraint. Hence, the control circuitry may determine that the first possible combination is the optimal combination in this example.

In some embodiments, control circuitry may generate for display a recommendation for the optimal combination so that the user may choose to access the media assets as planned. In some embodiments, the control circuitry may determine that the recommendation is a notification or dialog box containing selectable options for the user to directly order on-demand or schedule reminders and/or recordings for the media assets.

In some embodiments, control circuitry may determine that user input circuitry has received user input to register a user profile. The user profile may include user constraints for accessing media assets. For example, the control circuitry may determine that the user input circuitry can receive the user profile with a remote control on a television equipment, a computer keyboard, a Smartphone, a video game console, an electronic tablet, a second screen device, or any other user equipment input circuitry capable of registering user information.

In some embodiments, control circuitry may determine, based on user constraint, that fewer than all media assets of the subset can be accessed prior to the start time of the requested media asset. The control circuitry may generate for display a video summary of at least one media asset of the subset prior to the first start time of the requested media asset, in order to accommodate the first start time. For example, Episode 8 of The Blacklist is scheduled to air in 5 days, and no further broadcast time is available in the future. If the control circuitry determines that it is not possible to access all three episodes (Episodes 5, 6, and 7) prior to the scheduled broadcast time of Episode 8 (e.g., because the first time that Episode 7 is available will be 10 days later), the control circuitry may compile or retrieve a video summary of one of Episode 7 and generate the video summary for display in place of Episode 7.

In some embodiments, the video summary may be a trailer of the at least one media asset, a shortened version of the at least one media asset, or a compilation of highlights from the at least one media asset. For example, control circuitry may offer a link to an online trailer of Episode 7 (e.g., on an online video streaming service such as YouTube) prior to the broadcast time of Episode 8 so that the user may view a synopsis of the missing Episode.

In some other embodiments, control circuitry may generate a second recommendation based on a second aspect of the user constraint and generate for display the second recommendation. Using the example above, the control circuitry may determine that the user constraint may not only contain a budget ceiling of $5.00, but may also contain a second aspect that requires at least a Standard Definition (SD) video resolution for all recommended media assets. The control circuitry may generate a second recommendation based on this requirement for display so that the user may choose to select a viewing option based on her additional preferences.

In some embodiments, control circuitry may access a database and cross-reference data input by the user against the database to identify a user profile for the user. For example, the control circuitry may access a remote database where past user interactions are saved, and cross-reference more recent interaction data input by the user against the past user interactions stored in the database. In this way, the control circuitry may identify the user profile of the user, such as the fact that the user never turned on her television between the hours of 8:00 am and 6 pm.

In some embodiments, control circuitry may determine, based on the identified user profile, a set of user constraints. For example, the control circuitry may determine the user constraints based on the identified user profile that no programs scheduled to broadcast during the hours of 8:00 am and 6 pm should be recommended to the user, unless the programs are otherwise recordable.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DESCRIPTION

Figure 1:
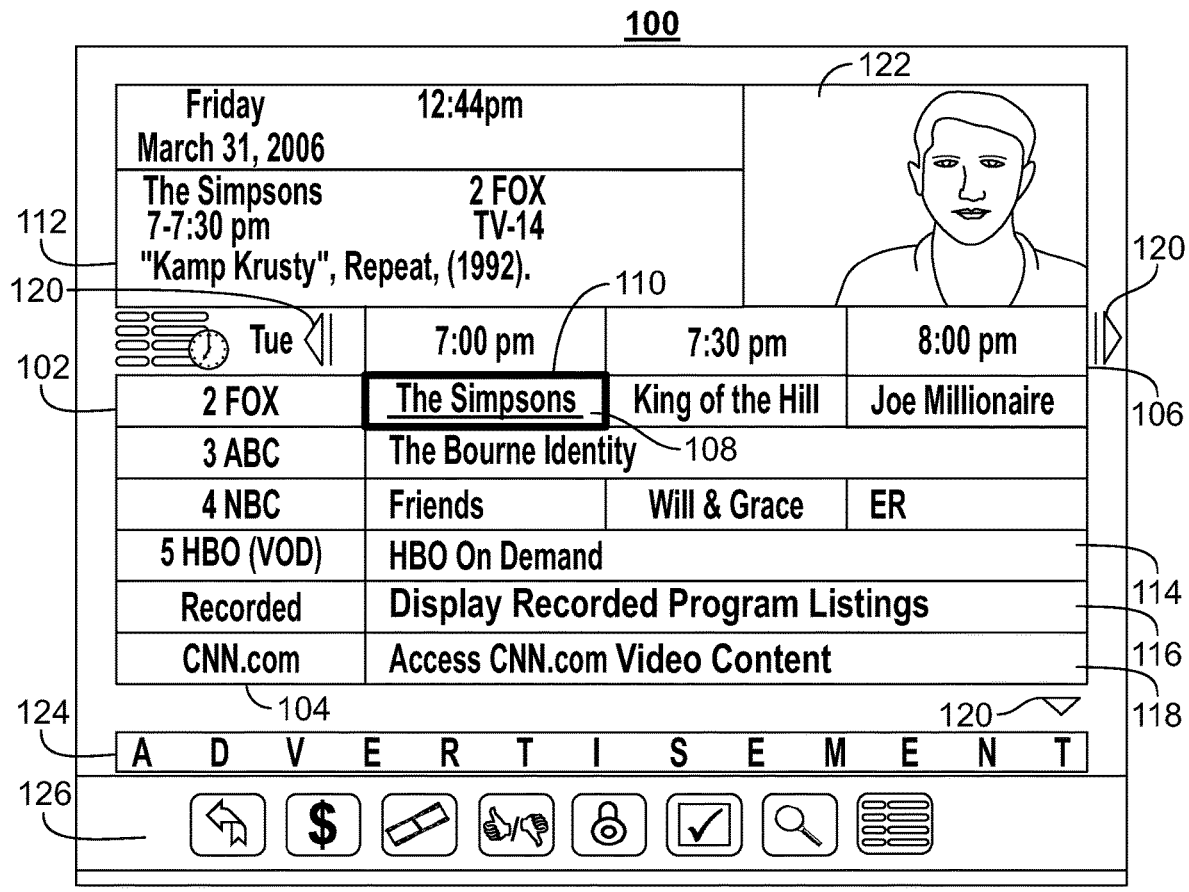
FIG. 1 shows an illustrative embodiment of a display screen that may be used to provide media guidance application listings and other media guidance information, in accordance with some embodiments of the disclosure.

Systems and methods are provided herein for automatically arranging contextually related media assets for a user to access. In some aspects, these systems and methods comprise determining a user constraint and a subset of media assets that the user has not yet viewed so as to generate a recommendation, based on the user constraint, for the user to view the media assets in the correct contextual order.

In some embodiments, control circuitry may determine that user input circuitry has received, from the user, a request to access a media asset. For example, the user may schedule a reminder for Episode 8 of the TV series The Blacklist on user equipment using a remote control. Control circuitry may determine that the request indicates that the recording is scheduled for the airing in 5 days.

In some embodiments, control circuitry identifies a first set of media assets by consulting a database (or other storage circuitry). Control circuitry may ensure that each media asset of the first set of media assets is released prior to a release date of the requested media asset. Additionally, control circuitry may ensure that each media asset of the first set of media assets shares a context with the requested media asset—e.g., by being sequential episodes of a series, movie sequels, or other contextually related videos. For example, the control circuitry of the user equipment may consult a remote server to identify media assets that share a context with the scheduled Episode 8 of The Blacklist, such as Episode 7 available on an online video streaming service (e.g., Netflix), Episode 6 scheduled to air in 2 days, and an on-demand Episode 5 available for purchase on another online video streaming service (e.g., Amazon Instant Video).

In some embodiments, control circuitry may determine a subset of media assets of the first set of media assets, where the subset of media assets have not been viewed by the user. In some embodiments, the control circuitry may make the determination by performing a comparison of each media asset of the first set of media assets against a viewing history of the user. For example, the viewing history of the user may indicate that Episodes 1-4 have previously been viewed by the user. The control circuitry may accordingly recommend to the user Episodes 5, 6, and 7 prior to the scheduled airing time of Episode 8.

In some embodiments, control circuitry may access a user profile to determine a user constraint. The control circuitry may determine that the user constraint indicates criteria for finding and arranging the contextually related media assets, such as video resolution, total cost of purchase (i.e., budget), timing of broadcast, duration, theme, availability, mode of delivery, speed of access, user availability, and other user preferences for the media assets. For example, control circuitry may access the user profile to determine that the user has set a constraint for a total budget of "$5.00" and resolution of "SD or above." The control circuitry may make any subsequent arrangement of episodes 6 and 7 for the user that fulfills the user constraint.

In some embodiments, control circuitry may generate a recommendation based on a first aspect of the user constraint. The control circuitry may determine that the recommendation includes a recommended manner of accessing each media asset of the subset prior to a first start time of the requested media asset. For example, the control circuitry may recommend accessing Episodes 5, 6, and 7 based on the user budget constraint of no more than $5.00, and find that an online media store (e.g., Apple iTunes Store) offers all three episodes at $4.50 for a limited time. If the episodes on the online media store can be accessed prior to the start time of the scheduled Episode 8, the control circuitry may generate a recommendation containing Episodes 5, 6, and 7 as found on the online media store, along with their associated cost and timing information.

In some embodiments, control circuitry may generate the recommendation for display. For example, the control circuitry of the user equipment may generate for display a notification box indicating that Episodes 5, 6, and 7 may be accessed from an online media store (e.g., Apple iTunes Store) prior to the scheduling broadcast time of Episode 8, for a total cost that is within the budget set by the user constraint.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
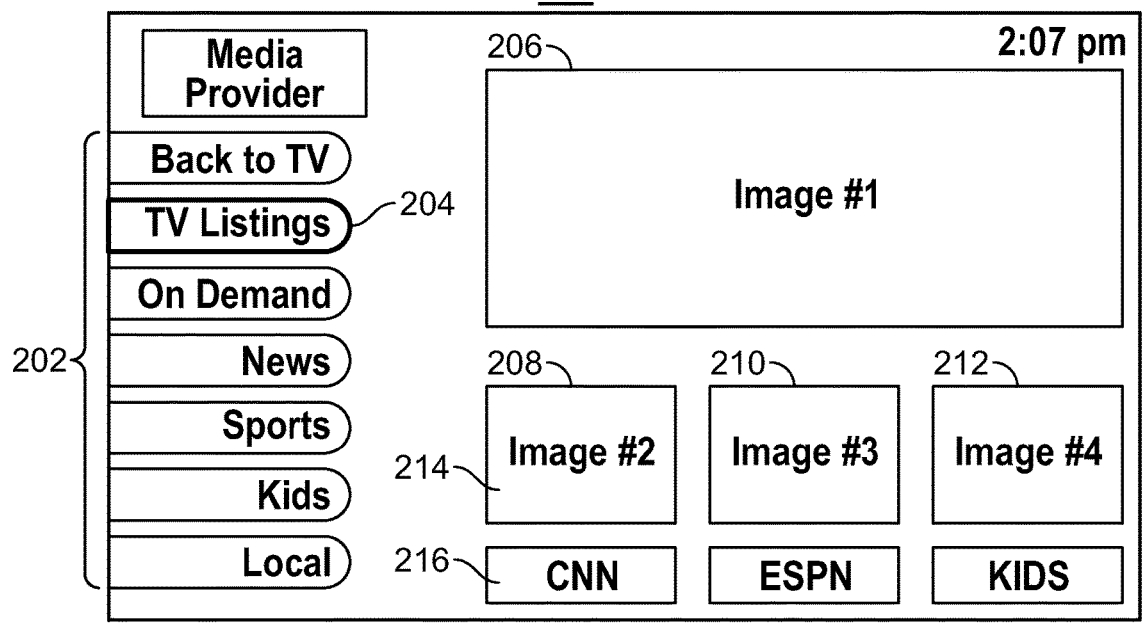
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
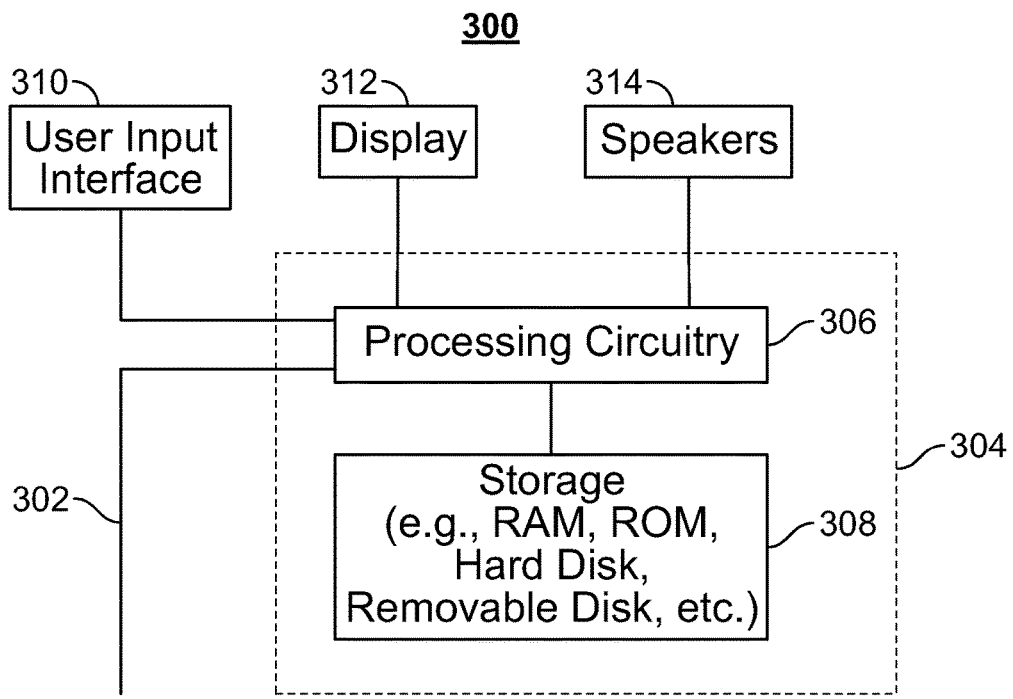
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with control circuitry 304 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
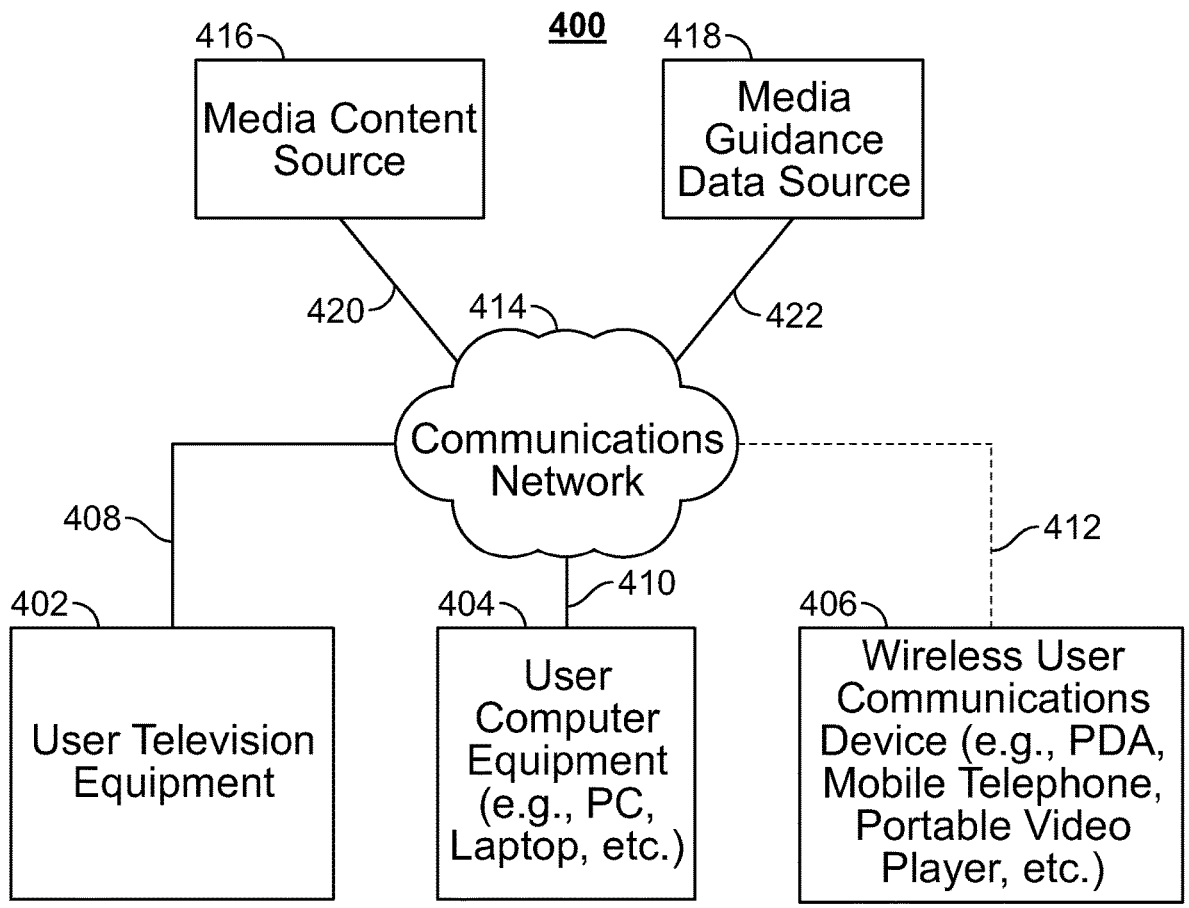
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct control circuitry 304 to generate the guidance application displays and transmit the generated displays to the user equipment devices. The server application may instruct control circuitry 304 of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YouTube, Netflix, Amazon Instant Video, and Hulu, which provide audio and video via IP packets. YouTube is a trademark owned by Google Inc., Netflix is a trademark owned by Netflix Inc., Amazon Instant Video is a trademark owned by Amazon.com, Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
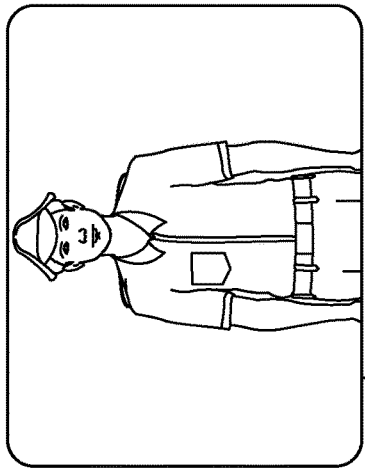
FIG. 5 is an illustrative embodiment of a display screen that may be used to provide recommendation for media assets contextually related to a requested media asset, in accordance with some embodiments of the disclosure.

FIG. 5 is an illustrative embodiment of a display screen that may be used to provide recommendation for media assets contextually related to a requested media asset, in accordance with some embodiments of the disclosure. As illustrated in FIG. 5, control circuitry 304 causes display screen 500 to display an exemplary page on which a user may schedule Season 1, Episode 8 of The Blacklist ("General Ludd") to be recorded when it airs on Channel 150 on November 8 (in 5 days). Control circuitry 304 may receive a user instruction, by way of user interface circuitry 310, to navigate the highlighted cursor to button 510, Schedule to Record, among other buttons to perform other functions. For example, if control circuitry 304 detects that the user navigates the highlighted cursor to button 520, control circuitry 304 may cause a reminder to be scheduled for the scheduled broadcast of this episode.

Control circuitry 304 may use window 530 on display screen 500 to present a screenshot or a video related to the episode. In some embodiments, the video may be a trailer or a summary of plot points for the episode. In some other embodiments, control circuitry 304 may cause an advertisement to be displayed in window 530.

Control circuitry 304 may, in response to the user selecting button 510 to schedule this episode for recording, generate for display dialog box 540 on display screen 500 to provide recommendation options for the user. In particular, control circuitry 304 may determine that the user's viewing history may indicate that the user has watched Episodes 1-4 of the season. Control circuitry 304 may determine that when it detects a user selection of button 510, the user has requested to record Episode 8 of the season. Control circuitry 304 may determine, based on this information, that the user should watch Episodes 5, 6, and 7 prior to viewing Episode 8. It is understood that, while a "schedule to record" button 510 is used to illustrate the above features, other buttons and interactive interfaces are capable of achieving similar effects and are therefore well within the present disclosure. For example, control circuitry 304 may determine that a user has selected "set up reminder" button 520 for Episode 8, and may subsequently determine that the user should be reminded to watch Episodes 5, 6, and 7 prior to viewing Episode 8. As another example, control circuitry 304 may generate for display a table of all available episodes in a grid format. Upon determining that the user input circuitry has received a user request to select Episode 8 from the grid, control circuitry 304 may determine that Episodes 5, 6, and 7 should be viewed prior to Episode 8.

Control circuitry 304 may determine the sources from which the Episodes are available, and create an optimal combination based on a set of user constraints. For example, control circuitry 304 may determine that the user has defined two user constraints—1) total budget $5.00; and 2) show media assets available for access between 1:00 pm and 5:00 pm. Control circuitry 304 may determine the user constraints by looking up a locally-implemented storage system, such as storage 308, or by cross-referencing data stored on a remote database, such as media guidance data source 418. Based on these user constraints, control circuitry 304 may find a subset of all media assets that are contextually related to Episode 8, and provide options 544, 546, and 548 for the user. In some embodiments, control circuitry 304 may determine that the combination of options 544, 546, and 548, as shown in box 542, is an optimal combination based on the user constraints, the user's viewing history, and available sources of media assets.

Control circuitry 304 may determine that the user has selected one or more of options 544, 546, and 548 to access the corresponding media asset individually. Alternatively, control circuitry 304 may determine that the user has selected box 542 to accept the recommended optimal combination. Control circuitry 304 may determine that the user has selected EXIT button 541 to discard the recommendation.

In some embodiments, control circuitry 304 may determine that user input circuitry, such as user input interface 310, has received a request from a user to access a media asset. Control circuitry 304 may automatically arrange media assets that are contextually related to the requested media asset for access prior to a first start time of the requested media asset. User input interface 310 and control circuitry 304 may be present on any user equipment device 402, 404, or 406. Control circuitry 304 may identify a first set of media assets that share a context with the requested media asset by consulting a database implemented on a local storage (e.g., from storage 308) or a remote server (e.g., media content source 416) by way of communications network 414. In some embodiments, control circuitry 304 may generate recommendations for display by outputting it to any or all of display 312 and speakers 314.

In some embodiments, control circuitry 304 may identify the first set of media assets, where each media asset of the first set was released prior to a release date of the requested media asset. In some embodiments, the requested media asset and the media assets in the first set of media assets may be sequential episodes, movie sequels, or other contextually related videos.

In some embodiments, control circuitry 304 may compare each media asset of the first set against a viewing history of the user in order to determine a subset of the first set of media assets that the user has not yet viewed. The definition of the term "viewing history," wherever used in this disclosure, may include media assets that a user has viewed, recorded, purchased, scheduled to view, along with any additional information associated with these activities. For example, a user's viewing history may indicate that the user has viewed an episode of a television series two months ago, or that the user has purchased an on-demand movie but has not yet viewed it.

The term "release date" may be used to indicate the date that a media asset first becomes publicly accessible. The present disclosure uses the release date, among other things, to determine relative contextual order and relationship of media assets. In the example of episodes of a TV series, the release dates correspond to the episode numbers, and hence, contextual progress. In movie sequels, the release dates suggest a preferred order of viewing the movies, such that The Godfather, released in 1972, should be viewed before The Godfather: Part II, released in 1974.

It is understood that the release date is not the only mechanism with which control circuitry 304 can determine relative contextual order and relationship of media assets. Other criteria, such as series number, sequel number, plot timeline, and other temporal information inherent to the context of the media assets may be used. For example, Star Wars Episode V: The Empire Strikes Back was released in 1980, whereas Star Wars Episode III: Revenge of the Sith was released in 2005. Control circuitry 304 may determine that Star Wars Episode III has a plot that is set in an earlier time than Star Wars Episode V. Consequently, control circuitry 304 may recommend Star Wars Episode III for viewing prior to viewing Star Wars Episode V despite the fact that the former has a later release date.

In some embodiments, control circuitry 304 may access a user profile of the user to determine a user constraint. The term "user constraint," wherever used in this disclosure, may refer to any criteria that control circuitry 304 follows in locating and selecting media assets from the subset of the first set of media assets.

Control circuitry 304 may determine that user input interface 310 has received instructions from the user to register a profile. Alternatively, control circuitry 304 may intelligently monitor the user's activity with the user equipment (e.g., user television equipment 402) and automatically determines that the user does not interact with the user equipment during a 9:00 am-5:00 pm window on weekdays.

Consequently, control circuitry 304 may determine that the user profile should include an entry that avoids recommending media assets scheduled during 9:00 am-5:00 pm during weekdays. Control circuitry 304 may determine that the user constraint includes requirements on the video resolution, cost of purchase, timing of broadcast, duration, theme, availability, mode of delivery, or speed of access of the media asset.

Control circuitry 304 may determine that the user constraint additionally includes availability of the user and other general preferences of the user regarding the manner of accessing the media assets. For example, for a user who only accesses media assets between 8:00 am and 5:00 pm (e.g., perhaps because the user works in a night shift job and only has availability during the day), control circuitry 304 may specify a user constraint that limits control circuitry 304 to only look for media assets available during the hours of 8:00 am-5:00 pm. As another example, control circuitry 304 may determine, from a user's profile, that the user wishes to limit the themes of the media assets being recommended to "non-violent" and "kids-friendly" only, and would recommend media assets in these two categories accordingly.

In some embodiments, control circuitry 304 may access the user profile to determine the user constraint by cross-referencing data from the user profile with a user profile database, such as a database implemented using a local storage (e.g., storage 308) or implemented on a remote server (e.g., media content source 416). Control circuitry 304 may subsequently cross-reference a user constraint entry from the user profile data to determine the user constraint. In some embodiments, the user constraint may include multiple aspects.

Control circuitry 304 may generate a recommendation based on a first aspect of the user constraint. In some embodiments, control circuitry 304 may determine that the recommendation comprises a recommended manner of accessing each media asset of the subset prior to the start time of the requested media asset. Control circuitry 304 may determine that the recommended manner is derived from both timing and user constraint considerations. For example, control circuitry 304 may determine that some media assets of the subset are available prior to the starting time of the requested media asset and that these media assets would fulfill the timing consideration. In some embodiments, control circuitry 304 may determine that the starting time of the requested media asset is a scheduled broadcast time for the requested media asset. Control circuitry 304 may also determine that some media assets of the subset fulfill one or more aspects of the user constraint as defined in the user profile. In some embodiments, control circuitry 304 may only recommend media assets that fulfill both the timing and the user constraint considerations to the user for selection.

In some embodiments, control circuitry 304 may intelligently evaluate the viewing history of the user to determine whether to selectively factor in certain information in the viewing history. Control circuitry 304 may factor in information in the user's viewing history, for example, if the information has been updated recently. On the other hand, control circuitry 304 may not factor in information in the user's viewing history if the information contradicts more recent data. As an example, control circuitry 304 may determine that a user's viewing history indicates that the user has viewed Episode 5 of the TV series The Blacklist over a year ago, and that the user has recently viewed Episodes 1-4 within the past two days. When control circuitry 304 determines that the user has scheduled Episode 8 of The Blacklist for recording, control circuitry 304 may intelligently determine that a recommendation of an appropriate manner of accessing Episode 5 should still be provided to the user despite the fact that Episode 5 appears in the user's viewing history. Having the option to view Episode 5 again before viewing the subsequent Episode 8 allows the user to refresh plot points that may have been forgotten over the one-year period since the last time the user viewed Episode 5.

In some embodiments, control circuitry 304 may determine that at least one media asset in the subset cannot be accessed prior to the starting time of the requested media asset (i.e., a first starting time). For example, control circuitry 304 may determine that one of the media assets not yet viewed by the user is unavailable for access, from any sources, until after the first starting time of the requested media. In this situation, control circuitry 304 may automatically generate a notification, for display on display 312, indicating that one of the media assets is unavailable prior to the first starting time of the requested media. Control circuitry 304 may subsequently search for an alternative viewing opportunity for the requested media, such as another broadcast of the requested media at a second starting time later than the first starting time. If control circuitry 304 is able to find the second starting time for the requested media asset given the user constraints, control circuitry 304 may consult the database (e.g., storage 308 or media content source 416) again to determine if the alternative viewing opportunity of the requested media, at the second starting time, allows for each media asset in the subset to be accessed.

In some embodiments, control circuitry 304 may intelligently analyze plot points of the subset of media assets to deduce media assets that may be of special interest to the user. For instance, for a user whose viewing history has indicated a clear inclination to watch action scenes, control circuitry 304 may choose one or more of the media assets in the subset that contain plot points matching these preferences of the user for prioritization. This prioritization scheme is especially useful in situations where not all media assets of the subset can be accessed prior to the broadcast time of the requested media asset. Control circuitry 304 may preferentially access the higher-priority media assets (e.g., those with plot points indicating long action-scenes) prior to the starting time of the requested media asset, and replace the lower-priority media assets with a video summary, such as a trailer, a shortened version, or a compilation of highlights for the lower-priority media assets.

In some embodiments, control circuitry 304 may receive input from a user, by way of user input interface 310, to register a user profile, which contains user constraints for accessing media assets. In addition to the user constraints as described above, control circuitry 304 may determine that the user profile additionally contains the user's viewing history and themes of interest. For example, control circuitry 304 may determine that a user has answered a questionnaire including movies and episodes of a television series that the user has viewed or purchased (i.e., the viewing history). Based on the viewing history of the user, control circuitry 304 may also deduce themes, or genres, that the user takes an interest in (i.e., themes of interest of the user). Control circuitry 304 may use the viewing history to determine the subset of media assets contextually related to a requested media asset and has not yet been viewed by the user, thereby providing a recommendation for the user. Control circuitry 304 may use the themes of interest of the user to further refine the recommendation when not all of the media assets in the subset can be viewed prior to the starting time of the requested media (given the user constraint) and the prioritization scheme needs to be applied. As illustrated before, control circuitry 304 may give a media asset matching the user's themes of interest a higher priority than a media asset that does not match the user's themes of interest. Control circuitry 304 may recommend the media asset with the higher priority in its entirety, and replace the media asset with the lower priority with a trailer or another form of video summary.

In some embodiments, control circuitry 304 may automatically permute possible combinations of the manners of accessing the media assets to generate an evaluation metric, such as a timing and cost metric, for each possible combination. For example, in one possible combination, control circuitry 304 may order Episode 5 on television for $2.00, order Episode 6 on an online media store (e.g., Apple iTunes Store) for $1.00 and schedule Episode 7 for recording in 10 days for $0.00. In another possible combination, control circuitry 304 may order Episodes 5 and 6 like in the first possible combination, and order Episode 7 on an online video streaming service (e.g., Amazon Instant Video) for $5.00. Control circuitry 304 may generate an evaluation metric, such as a timing and cost metric, for each possible combination, such that the first possible combination will be accessible in 10 days and costs $3.00, and the second possible combination will be accessible instantly and costs $8.00.

In some embodiments, control circuitry 304 may compare the evaluation metric for each possible combination against the user constraint to determine an optimal combination. In the above example, control circuitry 304 may, based on the user constraint of a "$5.00" total budget, determine that only the first possible combination meets the user constraint. Hence, control circuitry 304 may determine that the first possible combination is the optimal combination in this example.

In some embodiments, control circuitry 304 may generate for display, using display 312, the optimal combination for recommendation. Alternatively, control circuitry 304 may announce the optimal combination to the user using speakers 314, and any other suitable user-interfacing devices.

Figure 6:
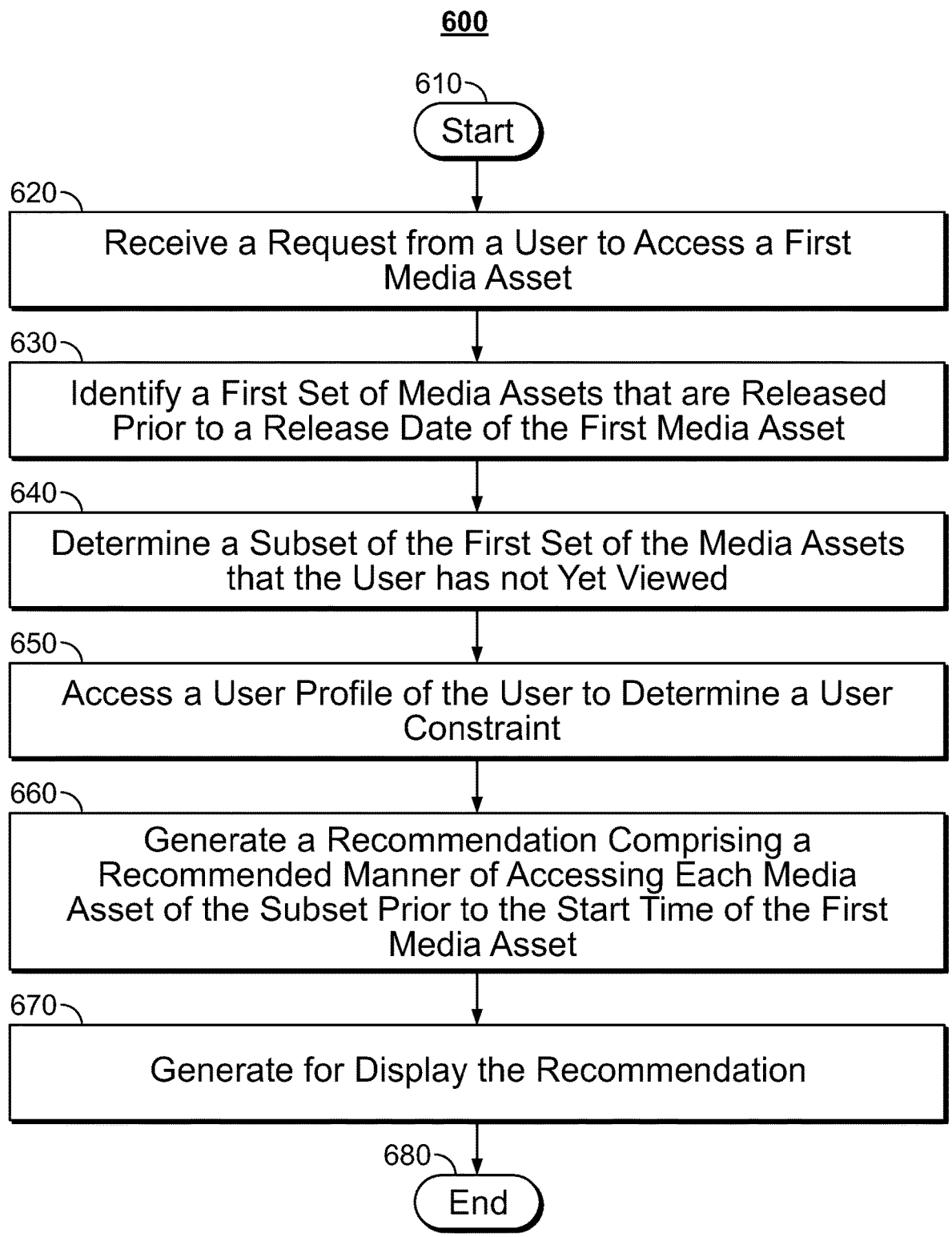
FIG. 6 is a flowchart of illustrative steps involved in arranging media assets that are contextually related to a requested media asset for access, in accordance with some embodiments of the disclosure.

FIG. 6 is a flowchart of illustrative steps involved in arranging media assets that are contextually related to a requested media asset for access, in accordance with some embodiments of the disclosure. It should be noted that process 600 or any step thereof could be performed on, or provided by, any of the devices shown in FIGS. 3-4. For example, process 600 may be executed by control circuitry 304 (FIG. 3) as instructed by control circuitry implemented on user equipment 402, 404, and/or 406 (FIG. 4) in order to automatically arrange media assets that are contextually related to a requested media asset prior to a starting time of the requested media asset. In addition, one or more steps of process 600 may be incorporated into or combined with one or more steps of any other process or embodiment (such as process 700 of FIG. 7).

Process 600 begins at 610 and proceeds to 620, where control circuitry (e.g., control circuitry 304) may determine that user input circuitry (e.g., user input interface 310) has received a request from a user to access a first media asset. For example, control circuitry 304 may determine that user input interface 310 has received a request from a user to schedule Episode 8 of the TV series The Blacklist for recording (e.g., in the form of a selection of button 510 "Schedule to Record").

At 630, control circuitry 304 may identify a first set of media assets that are released prior to a release date of the first media asset. In some embodiments, control circuitry 304 may determine that the first set of media assets and the requested first media asset are contextually related media assets. In some embodiments, control circuitry 304 identifies the first set of the media assets by consulting a database. For example, control circuitry 304 may identify Episodes 1-7 of The Blacklist as being released prior to the release date of Episode 8. Control circuitry 304 may identify Episodes 1-7 by consulting a database, such as storage 308, and determining that they are contextually related to Episode 8. Process 600 may then continue to 640.

At 640, control circuitry 304 may determine a subset of the first set of the media assets, where the subset contains media assets that the user has not yet viewed. In some embodiments, control circuitry 304 may make the determination by comparing the first set of media assets against a viewing history of the user. For example, control circuitry 304 may determine a subset of Episodes 1-7, such as Episodes 5, 6, and 7, where the subset (Episodes 5, 6, and 7) have not yet been viewed by the user. Control circuitry 304 may do so by comparing the first set of media assets, i.e., Episodes 1-7, against the viewing history of the user, i.e., Episodes 1-4, to make the determination. Process 600 then continues to 650.

At 650, control circuitry 304 may access a user profile to determine a user constraint associated with the user. Control circuitry 304 may determine that the user profile has previously entered by the user using user input circuitry or any other suitable means. In some embodiments, control circuitry 304 retrieves user constraint of the user profile to filter the subset of media assets not previously viewed by the user. For example, control circuitry 304 may access a user profile of the user's, such as one stored on storage 308, to determine a user constraint (e.g., total budget of "$5.00" and video resolution of "SD or above") associated with the user. Control circuitry 304 may determine that the user constraint associated with the user may have previously been entered by the user using user input interface 310. Control circuitry 304 may also retrieve the user constraint to filter Episodes 5, 6, and 7. Process 600 then proceeds to 660.

At 660, control circuitry 304 may generate a recommendation comprising a recommended manner of accessing each media asset of the subset prior to the starting time of the requested first media asset. In some embodiments, control circuitry 304 may determine the recommended manner of accessing the media assets based on the user constraint as determined at 650. At 670, control circuitry 304 generates for display the recommendation. In some embodiments, control circuitry 304 may generate for display the recommendation on a display device. For example, control circuitry 304 may generate a recommendation for display on display device 312, where the recommendation comprises a recommended manner of accessing each episode of Episodes 5, 6, and 7 prior to the starting time (Nov. 11, 2013) of Episode 8. Process 600 ends at 680.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
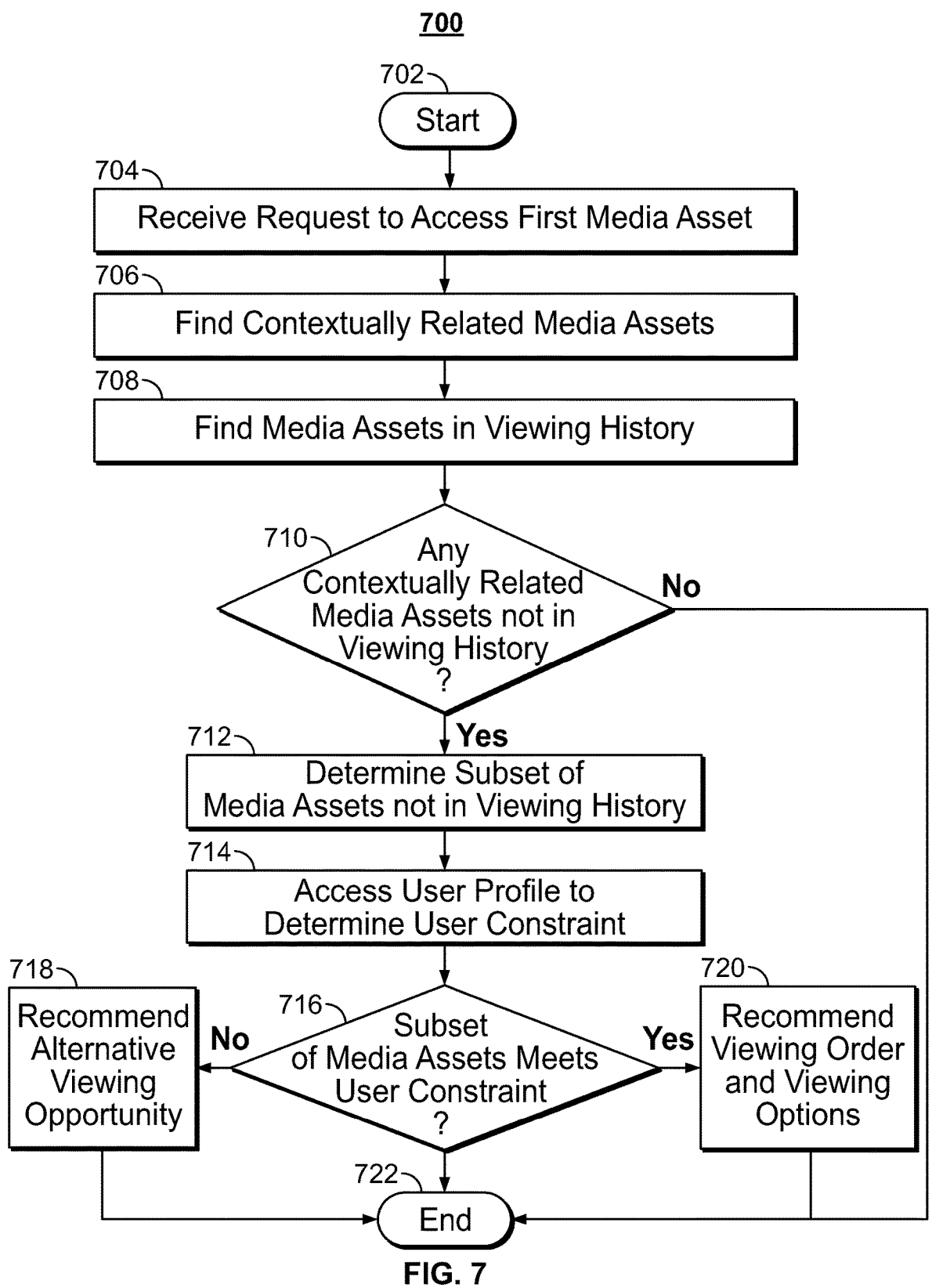
FIG. 7 is a flowchart of illustrative steps involved in determining media assets contextually related to a requested media asset and have not yet been accessed and generating a recommendation, in accordance with some embodiments of the disclosure.

FIG. 7 is a flowchart of illustrative steps involved in determining media assets contextually related to a requested media asset and have not yet been accessed and generating a recommendation, in accordance with some embodiments of the disclosure. It should be noted that process 700 or any step thereof could be performed on, or provided by, any of the devices shown in FIGS. 3-4. For example, process 700 may be executed by control circuitry 304 (FIG. 3) as instructed by control circuitry implemented on user equipment 402, 404, and/or 406 (FIG. 4) in order to determine a context of a media asset. In addition, one or more steps of process 700 may be incorporated into or combined with one or more steps of any other process or embodiment (such as process 600 of FIG. 6).

Process 700 begins at 702 and proceeds to 704, where control circuitry (e.g., control circuitry 304) may determine that user input circuitry (e.g., user input interface 310) has received a request to access first media asset from a user. As an example, a user may use remote control associated with user television equipment 402 to request access to an episode (e.g., Episode 8) of a television series (e.g., The Blacklist). Process 700 may then continue to 706.

At 706, control circuitry 304 may find contextually related media assets for the requested first media asset by querying a database. In some embodiments, control circuitry 304 may determine that the contextually related media assets have a release date prior to the release date of the requested first media asset. For example, contextually related media assets to Episode 8 of The Blacklist may be Episodes 1-7, which are released prior to the release date of Episode 8 (Nov. 11, 2013). After control circuitry 304 finds the contextually related media assets, process 700 may proceed to 708.

At 708, control circuitry 304 may find media assets in a user's viewing history. In some embodiments, control circuitry 304 may define the viewing history in the user's profile. The viewing history may contain media assets that the user has viewed, recorded, or otherwise accessed, along with additional information associated with the media assets, such as timestamps of the recording and date of viewing. It should be noted that control circuitry 304 may carry out 706 and 708 in any conceivable order (one before the other or concurrently) without going beyond the scope of the present disclosure. For example, control circuitry 304 may find Episodes 1-4 of The Blacklist to be in the user's viewing history, which correspond to the episodes that the user has viewed. Process 700 may then proceeds to 710.

At 710, control circuitry 304 compares the set of contextually related media assets against the media assets in the user's viewing history to determine if any contextually related media assets have not yet been viewed by the user. If control circuitry 304 determines that every contextually related media asset has been viewed by the user (appears in the user's viewing history), process 700 may proceed to 722 to end. On the other hand, if control circuitry 304 determines that at least one contextually related media asset does not appear in the viewing history, process 700 may proceed to 712. For example, control circuitry 304 may compare Episodes 1-7 against the user's viewing history of Episodes 1-4, and determines that three episodes (Episodes 5, 6, and 7) do not appear in the viewing history. In this example, process 700 proceeds to 712. However, in another example, control circuitry 304 may determine that all seven episodes (Episodes 1-7) appear in the user's viewing history—and process 700 will proceed to 722 to end.

At 712, control circuitry 304 determines a subset of media assets that are not in the viewing history of the user. For example, control circuitry 304 may determine that Episodes 5, 6, and 7 are in the subset of media assets that are not in the viewing history of the user. In some embodiments, even if each and every contextually related media asset appears in the user's viewing history, control circuitry 304 may still determine that some media assets should become part of the subset because they were last accessed by the user over a threshold period of time ago. For instance, out of the contextually related and Episodes 1-5 which have been viewed by the user, if control circuitry 304 determines that the user has accessed Episodes 1-4 in the last two days, but has accessed Episode 5 over two years ago, control circuitry 304 may still include Episode 5 in the subset of media assets.

At 714, control circuitry 304 may access a user profile to determine a user constraint. In some embodiments, control circuitry 304 determines that the user profile has previously been entered by the user via user input interface 310. As discussed above in relation to FIG. 6, control circuitry 304 may determine that the user constraint defines a set of criteria that the media assets to be recommended should fulfill. For example, control circuitry 304 may access the user's profile to determine the user constraint of a total budget of "$5.00" and a video resolution of "SD or above." Process 700 may then continue to 716.

At 716, control circuitry 304 filters the subset of media assets with the user constraint to determine if any of the media assets meet the user constraint requirement. If control circuitry 304 determines that media assets of the subset meet the user constraint, at 720, control circuitry 304 recommends viewing order and viewing options to the user in a display screen, such as display screen 500 of FIG. 5. If, however, control circuitry 304 determines that at least one of the media assets of the subset cannot meet the user constraint, control circuitry 304 may recommend alternative viewing opportunity for the requested first media asset at 718 (e.g., another broadcast of the requested first media asset starting at a second time). For example, control circuitry 304 may determine that Episodes 5, 6, and 7 can all be found from the various sources of media assets, and proceed to recommending the viewing order and viewing options of Episodes 5, 6, and 7. Control circuitry 304 may recommend the viewing order of Episodes 5, 6, and 7 based on the episode number. In addition, control circuitry 304 may recommend the viewing options based on the user constraint, such that the total cost of accessing all three episodes is within the $5.00 budget and all three episodes have at least a standard definition resolution, as required in the user constraint. In some embodiments, control circuitry 304 may recommend additional subsets of media assets that are contextually related to the requested media asset, if the additional subsets also fulfill the user constraints.

After control circuitry 304 recommends alternative viewing opportunity at 718, or recommends viewing order and viewing options for the determined subset of media assets (which also fulfill the user constraint), process 700 may proceed to end at 722.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, determination of a conceptual boundary, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, the media stream as described herein may be stored in, and retrieved from, storage 308 of FIG. 3, or media guidance data source 418 of FIG. 4. Furthermore, processing circuitry, or a computer program, may update settings associated with a user, such as user profile preferences, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for providing media asset recommendations, the method comprising:
   receiving data indicating a selection of a first media asset;
   determining, using control circuitry, by querying a database, whether a second media asset contextually related to the first media asset was previously viewed by a user;
   in response to determining that the second media asset was not previously viewed by the user, determining, using the control circuitry, whether the second media asset is currently available for play by a media device associated with the user;
   in response to determining that the second media asset is not currently available for play by the media device, determining, using the control circuitry, whether the second media asset will be available for play by the media device at a later time; and
   in response to determining that the second media asset will be available for play by the media device at the later time, generating for display, on a display device, a recommendation to play the second media asset at the later time and to play the first media asset after playing the second media asset.

2. The method of claim 1, wherein determining whether the second media asset contextually related to the first media asset was previously viewed by the user comprises:
   querying the database for media assets contextually related to the first media asset that were released prior to a release date of the first media asset;
   comparing the media assets against a viewing history of the user;
   determining, based on the comparing, whether the user has previously viewed a given media asset; and
   in response to determining that the user has not previously viewed the given media asset, selecting the given media asset as the second media asset.

3. The method of claim 1, wherein determining whether the second media asset is currently available for play by the media device comprises querying a database of media assets currently available for play for the second media asset.

4. The method of claim 1, wherein determining whether the second media asset is currently available for play by the media device comprises:
   determining a user constraint from a profile associated with the user;
   querying the database for an access parameter of the second media asset; and
   determining whether the access parameter of the second media asset satisfies the user constraint,
   wherein the user constraint comprises at least one of a video resolution, a time of availability, a duration, a theme, a mode of delivery, a speed of access, or a user preference.

5. The method of claim 4, wherein generating for display the recommendation to play the second media asset at the later time and to play the first media asset after playing the second media asset comprises:
   determining a plurality of manners of accessing the first media asset and the second media asset;
   generating an evaluation metric for each of a plurality of possible combinations of the manners of accessing the first media asset and the second media asset;
   determining whether the evaluation metric for a given combination of the plurality of possible combinations satisfies the user constraint; and
   in response to determining that the evaluation metric for the given combination satisfies the user constraint, generating for display the recommendation based on the given combination.

6. The method of claim 4, wherein determining the user constraint from the profile associated with the user comprises:
   cross-referencing data input by the user with data in the database to identify the profile associated with the user;
   retrieving the profile associated with the user; and
   retrieving, from the profile associated with the user, data indicating the user constraint.

7. The method of claim 1, wherein determining whether the second media asset will be available for play by the media device at the later time comprises querying the database for a future time when the second media asset will be available for play.

8. The method of claim 7, wherein querying the database for the future time when the second media asset will be available for play comprises retrieving, from the database, a scheduled availability time of the second media asset.

9. The method of claim 8, further comprising:
   determining a user constraint from a profile associated with the user; and
   determining whether the scheduled availability time of the second media asset satisfies the user constraint.

10. The method of claim 1, wherein the first media asset and the second media asset comprise one or more of sequential episodes, movie sequels, and contextually related videos.

11. A system for providing media asset recommendations, the system comprising:
   input circuitry configured to receive data indicating a selection of a first media asset; and
   control circuitry configured to:
      determine by querying a database, whether a second media asset contextually related to the first media asset was previously viewed by a user;

in response to determining that the second media asset was not previously viewed by the user, determine whether the second media asset is currently available for play by a media device associated with the user;

in response to determining that the second media asset is not currently available for play by the media device, determine whether the second media asset will be available for play by the media device at a later time; and in response to determining that the second media asset will be available for play by the media device at the later time, generate for display, on a display device, a recommendation to play the second media asset at the later time and to play the first media asset after playing the second media asset.

12. The system of claim 11, wherein the control circuitry is further configured to determine whether the second media asset contextually related to the first media asset was previously viewed by the user by:

querying the database for media assets contextually related to the first media asset that were released prior to a release date of the first media asset;

comparing the media assets against a viewing history of the user;

determining, based on the comparing, whether the user has previously viewed a given media asset; and in response to determining that the user has not previously viewed the given media asset, selecting the given media asset as the second media asset.

13. The system of claim 11, wherein the control circuitry is further configured to determine whether the second media asset is currently available for play by the media device by querying a database of media assets currently available for play for the second media asset.

14. The system of claim 11, wherein the control circuitry is further configured to determine whether the second media asset is currently available for play by the media device by:

determining a user constraint from a profile associated with the user;

querying the database for an access parameter of the second media asset; and determining whether the access parameter of the second media asset satisfies the user constraint, wherein the user constraint comprises at least one of a video resolution, a time of availability, a duration, a theme, a mode of delivery, a speed of access, or a user preference.

15. The system of claim 14, wherein the control circuitry is further configured to generate for display the recommendation to play the second media asset at the later time before playing the first media asset by:

determining a plurality of manners of accessing the first media asset and the second media asset;

generating an evaluation metric for each of a plurality of possible combinations of the manners of accessing the first media asset and the second media asset;

determining whether the evaluation metric for a given combination of the plurality of possible combinations satisfies the user constraint; and in response to determining that the evaluation metric for the given combination satisfies the user constraint, generating for display the recommendation based on the given combination.

16. The system of claim 14, wherein the control circuitry is further configured to determine the user constraint from the profile associated with the user by:

cross-referencing data input by the user with data in the database to identify the profile associated with the user;

retrieving the profile associated with the user; and retrieving, from the profile associated with the user, data indicating the user constraint.

17. The system of claim 11, wherein the control circuitry is further configured to determine whether the second media asset will be available for play by the media device at the later time by querying the database for a future time when the second media asset will be available for play.

18. The system of claim 17, wherein the control circuitry is further configured to query the database for the future time when the second media asset will be available for play by retrieving, from the database, a scheduled availability time of the second media asset.

19. The system of claim 18, wherein the control circuitry is further configured to:

determine a user constraint from a profile associated with the user; and determine whether the scheduled availability time of the second media asset satisfies the user constraint.

20. The system of claim 11, wherein the first media asset and the second media asset comprise one or more of sequential episodes, movie sequels, and contextually related videos.

* * * * *